United States Patent
Rutherford et al.

(10) Patent No.: US 8,418,656 B2
(45) Date of Patent: Apr. 16, 2013

(54) SOUND-MAKING PET TOY

(75) Inventors: Ryan Rutherford, Rutherford, NJ (US); Jonathan Willinger, Teterboro, NJ (US)

(73) Assignee: J.W. Pet Company, Inc., Teterboro, NJ (US)

(*) Notice: Subject to any disclaimer, the term of this patent is extended or adjusted under 35 U.S.C. 154(b) by 0 days.

(21) Appl. No.: 13/359,803

(22) Filed: Jan. 27, 2012

(65) Prior Publication Data

US 2012/0192807 A1   Aug. 2, 2012

Related U.S. Application Data

(60) Provisional application No. 61/436,677, filed on Jan. 27, 2011.

(51) Int. Cl.
*A01K 29/00* (2006.01)
*A63H 3/28* (2006.01)

(52) U.S. Cl.
USPC .................. 119/707; 446/184; 446/188

(58) Field of Classification Search .......... 119/707, 119/702, 709; 446/184, 188, 270, 297, 397, 446/409
See application file for complete search history.

(56) References Cited

U.S. PATENT DOCUMENTS

| | | | |
|---|---|---|---|
| 1,187,838 A * | 6/1916 | Hughes | 473/571 |
| 3,075,317 A * | 1/1963 | Craft | 446/207 |
| RE29,050 E * | 11/1976 | Hakim | 446/184 |
| 5,560,320 A * | 10/1996 | Plunk | 119/709 |
| 6,578,527 B1 * | 6/2003 | Mathers | 119/707 |
| 6,609,944 B1 * | 8/2003 | Viola | 446/409 |
| 6,935,274 B1 * | 8/2005 | Rothschild | 119/702 |
| 7,066,779 B2 | 6/2006 | Willinger | |
| 7,144,293 B2 * | 12/2006 | Mann et al. | 446/184 |
| 7,169,008 B2 * | 1/2007 | Ritchey | 446/71 |
| 7,201,117 B2 * | 4/2007 | Ritchey et al. | 119/709 |
| 7,833,079 B2 | 11/2010 | Willinger et al. | |
| 7,950,352 B2 * | 5/2011 | Specht | 119/707 |
| 8,186,309 B2 * | 5/2012 | Specht | 119/707 |

* cited by examiner

*Primary Examiner* — Yvonne Abbott
(74) *Attorney, Agent, or Firm* — Katten Muchin Rosenman LLP

(57) ABSTRACT

A sound-making pet toy includes a shell having an opening and an inner space accessible through the opening and a sound-making body having a reduced state and an expanded state larger than the reduced state. When the sound-making body is disposed in the opening, it has the reduced state and when it is disposed in the inner space, it has the expanded state. The sound-making body has a resilient air-holding body and a sound making device that is responsive to air from the air holding body passing through the sound-making body. When the sound-making body is in the expanded state, it is lodged against the inner surface of the shell. When the sound-making body is in the expanded state, it expels air from the resilient air holding body when a force impacts the shell. In the expanded state, it is larger than the opening.

23 Claims, 3 Drawing Sheets

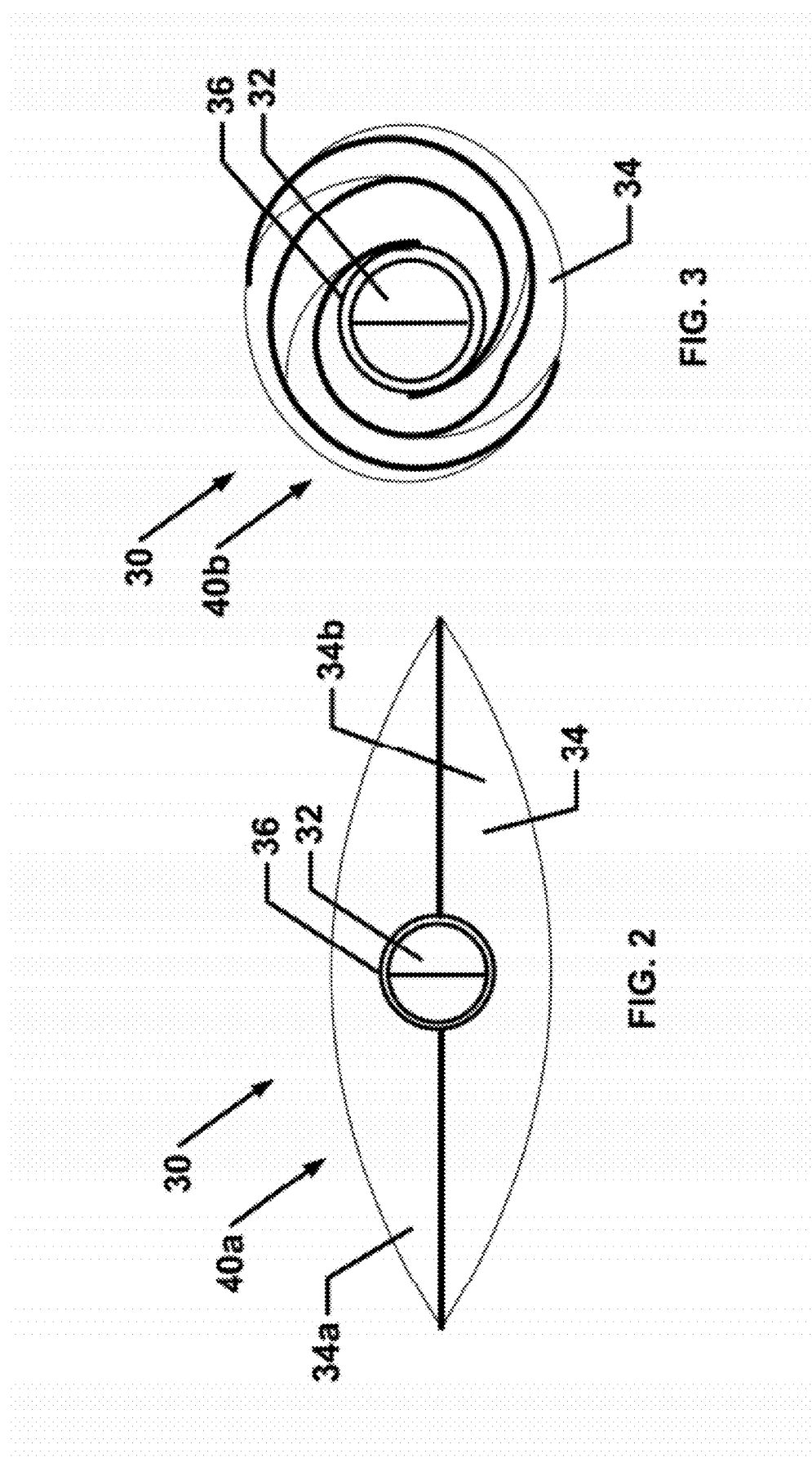

SOUND-MAKING PET TOY

CROSS-REFERENCE TO RELATED APPLICATIONS

This application is a non-provisional counterpart to and claims priority from U.S. Ser. No. 61/436,677 filed on Jan. 27, 2011, which is pending and which is hereby incorporated by reference in its entirety for all purposes.

FIELD OF THE INVENTION

The invention is directed to pet toys that include a sound-making device.

BACKGROUND OF THE INVENTION

Pet toys typically include an outer shell made of a durable material and a sound-making device. In each instance, the concern of toy maker is to prevent the sound-making device from dislodging and injuring the pet while also providing an economical method of producing the toy.

A rattle or a bell may be inserted into a toy shell, which is many times larger than the rattle or bell. As the shell, formed typically as a ball, rolls, the rattle or bell is tossed in the inside of the shell and make a sound. The method of manufacture is simple; however, since the rattle or bell is responsive to any movement, the toy lacks complexity when a pet plays with the toy.

A sound-making device may also be installed directly into a shell or a portion of the shell, or associated with the shell wherein the portion is protectively recessed or extended. For example, U.S. Pat. No. 7,066,779 and U.S. Pat. No. 7,833,079, which are hereby incorporated in their entirety for all purposes, teach various noise producing structures and methods for mounting squeakers. Such a toy has a higher complexity, since only a predefined pressure, such as a bite or impact with a solid object, will cause enough air to be expelled through the sound-making device to cause a sound. However, the toy is more difficult to manufacture due to the installation of the sound-making device.

What is needed is a structure of a toy that includes a sound-making device that when played with is complex, i.e., provides an intermittent sound, and also is economical to manufacture.

SUMMARY OF THE INVENTION

These and other needs are met by a pet toy of the present invention.

In accordance with one or more embodiments of the present invention, a sound-making pet toy includes a shell having an outer surface, an inner surface, and an opening. The opening connects the outer surface to the inner surface, which defines an inner space. A sound-making body is disposed in the inner space. The sound-making body includes a reduced size for passing through the opening to insert the sound-making body into the inner space and an operative size to prevent unintended removal of the sound-making body from the inner space. The sound-making body includes a resilient air-holding body and a sound making device. The air holding body holds a quantity of air when it has the operative size. The sound-making body makes a sound responsive to air from the air holding body passing through the sound-making body. When the sound-making body has the operative size, it is lodged against the inner surface of the shell. When the sound-making body has the operative size, it expels air from the resilient air holding body when a force impacts the shell. The sound-making body may have two lateral sides. When the sound-making body has the reduced size, it has a furled shape about a center of the sound-making body. When the sound-making body has the reduced size, it has a folded shape or in the furled shape and when it has the operative size it is lodged against the inner surface of the shell.

In accordance with one embodiment of the present invention, a sound-making pet toy includes a shell having an opening and an inner space accessible through the opening and a sound-making body having a reduced state and an expanded state larger than the reduced state. When the sound-making body is disposed in the opening, it has the reduced state and when it is disposed in the inner space, it has the expanded state. The sound-making body has a resilient air-holding body and a sound making device that is responsive to air from the air holding body passing through the sound-making body. When the sound-making body is in the expanded state, it is lodged against the inner surface of the shell. When the sound-making body is in the expanded state, it expels air from the resilient air holding body when a force impacts the shell. When the sound-making body is in the expanded state, it is larger than the opening.

In accordance with one or more embodiments of the present invention, a method of making a sound-making pet toy includes one or more of the steps of:
(a) providing the shell;
(b) providing the sound-making body;
(c) manipulating the sound-making body into the reduced state;
(d) inserting the sound-making body in the reduced state into the opening;
(e) moving the sound-making body from the opening into the inner space;
(f) causing the sound-making body to comprise the expanded state in the inner space.

Step (c) may require that the sound-making body is furled about a centerline between the lateral sides, that it is folded, or that it is rolled.

BRIEF DESCRIPTION OF THE DRAWINGS

FIG. 2 is a planar view of a sound-making device in a first state.

FIG. 3 is a planar view of a sound-making device in a second state.

DETAILED DESCRIPTION OF THE INVENTION

Figure 1:
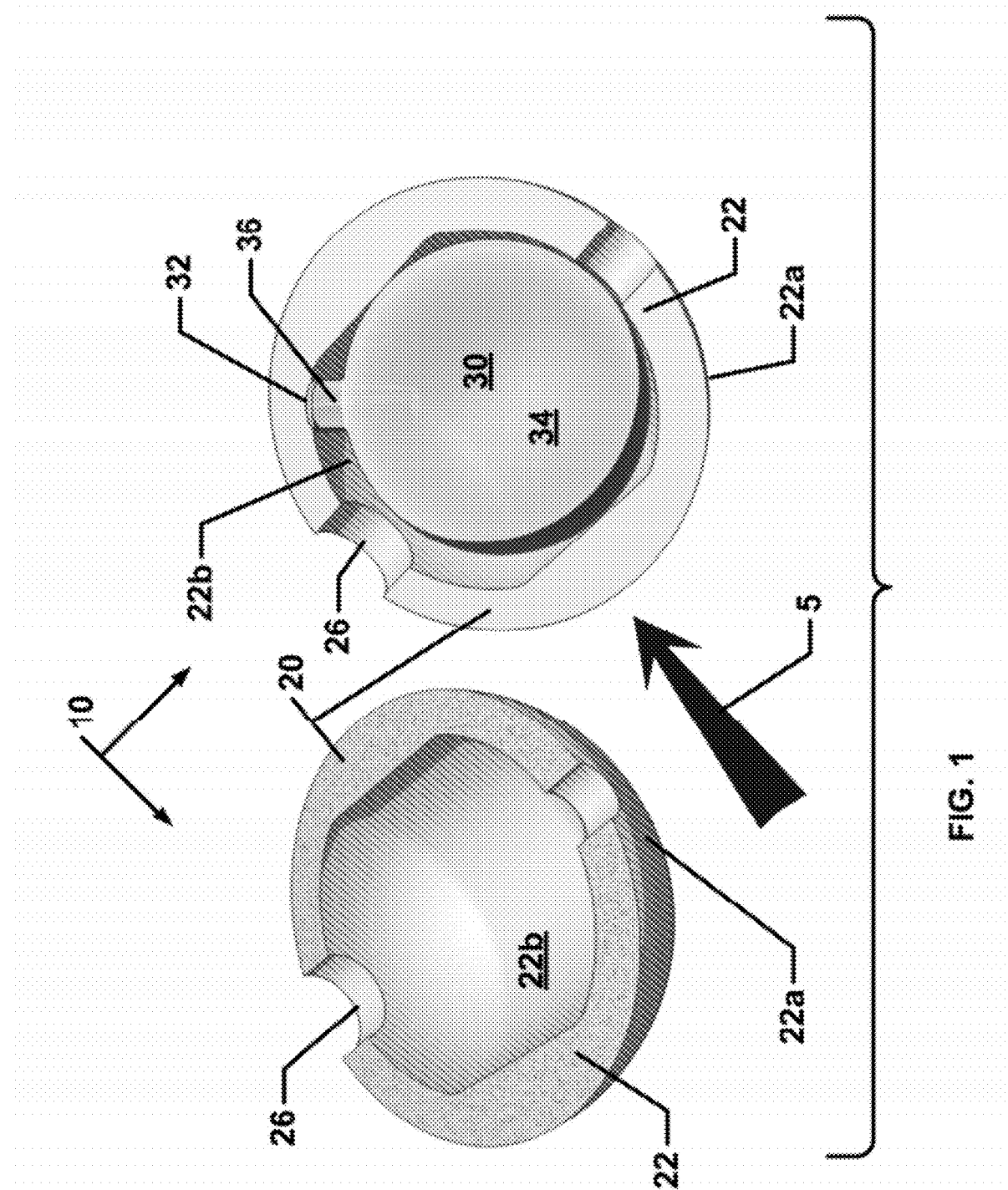
FIG. 1 is a cross-sectional view of a sound-making pet toy in accordance with one or more embodiments of the present invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

FIG. 1 is a cross-sectional view of a sound-making pet toy in accordance with one or more embodiments of the present invention. A sound-making pet toy 10 is responsive to a predetermined pressure, i.e., force, 5 to produce a sound due to air movement. Pressure 5 may be an impact with a solid object or the ground or a bite pressure.

Toy 10 comprises a first body 20 and a second body 30 disposed entirely in the first body. First body 20 is preferably made of natural or man-made rubber, vinyl, plastic, styrene-butadiene-styrene ("SBS") material, styrene-ethyl butadiene-styrene ("SEBS") material, or any other suitable resilient material known or to be invented and may comprise any suitable shape, such as a ball shape. First body 20 preferably comprises a shell 22 having an outer surface 22a and an inner surface 22b that define an inner space 24. First body 20 further comprises one or more openings 26 connecting inner space 24 to the ambient environment.

Inner surface 22b may be smooth, but may also comprise one or more extensions, in the form of one or more ridges, nubs, points and/or mounts in order to amplify and/or direct a pressure applied to outer surface 22a to second body 30.

Second body 30 preferably comprises or consists of a conventional pillow squeaker known in the art. Second body 30 may comprise any other suitable sound-making device having a sound-making device 32, a resilient air-holding body 34, and, preferably, a neck portion 36. Sound-making device 32 may be any suitable device that makes sound when air passes through, around, in, and/or about the device, but preferably device 32 comprises a natural or artificial reed held within a longitudinally-oriented body that is operationally held in neck portion 36.

Resilient body 34 is made of any suitable material, but preferably comprises PVC. Body 34 comprises a shell defining an enclosed space that is operatively connected to neck portion 36. During use, body 34 is normally filled with air. As a pressure is applied to toy 10, at least some of the air is forced from body 34 and passes through, around, in, and/or about sound-making device 36 causing the reed to vibrate and make a sound.

FIG. 2 is a planar view of a sound-making device in a first state 40a, extended or operative state. FIG. 3 is a planar view of a sound-making device in a second state 40b, reduced state. To make the toy 10, second body 30 is preferably obtained with a sound-making device 32 disposed in body 30 or such a sound-making device 32 is installed in body 30. Substantially all the air present in the second body 30, specifically, air-holding body 34 is emptied out by for example, squeezing it out. Second body 30 is then arranged into second state 40b by folding, rolling, and/or any other suitable means to fit through opening 26 of the first body. Therein, preferably, respective lateral portions 34a and 34b of air-holding body 34 are rolled about an axis passing through neck portion 26. Alternatively, lateral portions 34a and 34b are folded and/or rolled about a center of body 34 or a center of sound-making device 32 or body 34 folded and/or rolled a center of sound-making device 32.

Once inserted through opening 26, the second body 30, i.e., body 34, unfolds and/or unfurls, i.e., returning to substantially first state 40a. Ambient air may then fill air-holding body 34 and second body becomes lodged within first body 20. Body 34 may be impinged by inner surface 22b and may not fully unfold and/or unfurl; although, body 34 may sufficiently expand to hold and release air when pressure 5 is applied.

Second body 30 and opening 26 are preferably sized with respect to each other in such a way that the second body can pass through the opening when folded and/or rolled but that second body 30 cannot exit when unfolded and/or unfurled.

Moreover, first and second bodies 20, 30 are sized in such a way with respect to each other that when second body 30, in an unfolded and/or unfurled state, is disposed in the first body, the second body contacts inner surface 22b to be responsive to pressure 5 to released air from air-holding body 34.

Figure 4:
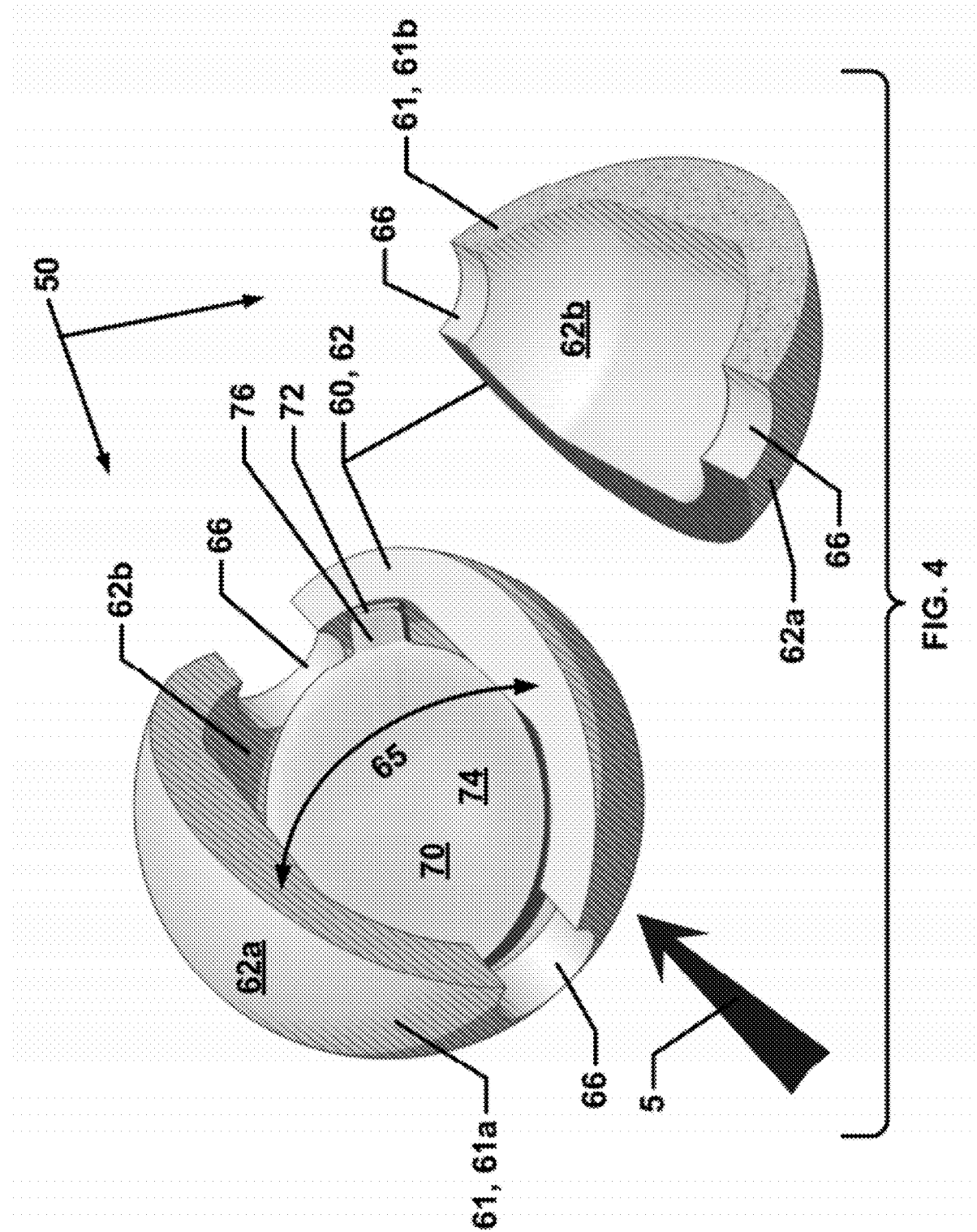
FIG. 4 is a cross-sectional view of a sound-making pet toy in accordance with one or more embodiments of the present invention.

FIG. 4 is a cross-sectional view of a sound-making pet toy in accordance with one or more embodiments of the present invention. A sound-making pet toy 50 is responsive to a predetermined pressure, i.e., force, 5 to produce a sound due to air movement. Pressure 5 may be an impact with a solid object or the ground or a bite pressure.

Toy 50 comprises a first body 60 and a second body 70 disposed entirely in the first body. First body 60 comprises a shell 62 having an outer surface 62a and an inner surface 62b that define an inner space 64. Shell 62 comprises one or more shell portions 61, such as first shell portion 61a and second shell portion 61b that may comprise identical, similar, or dissimilar materials with respect to color, weight, density, elasticity, type of material, adhesion, and/or mouthfeel of the material to an animal, such as a dog, to provide more interest and engagement for the animal than a unitary structure. Shell portions 61 may be joined by any method known, but preferably gluing or vulcanization is preferred.

Therein, portions 61 are preferably made of natural or man-made rubber, vinyl, plastic, styrene-butadiene-styrene ("SBS") material, styrene-ethyl butadiene-styrene ("SEBS") material, or any other suitable resilient material known or to be invented.

Shell 62 may comprise any suitable shape, such as a ball shape. Shell portions 61 comprise any suitable size and may be a whole and/or partial segment, whole and/or partial hemispheric segment, a part, a fraction, a fragment, a section, and/or a division of any suitable kind of shell 62. However, preferably one shell portion, such as shell portion 61a, comprises only a missing portion that is smaller than the extended state of second body 70, such as shell portion 61b. Therein, first body 60 comprises an opening 65 connecting inner space 64 to the ambient environment wherein the second body 70 must be inserted in a reduced state. First body 60 further may also comprise one or more openings 66 connecting inner space 64 to the ambient environment, but may also omit openings 66. Or, as in a preferred embodiment, body 60 consists, before finished manufacture, of opening 65 and one opening 66 as a vent hole, i.e., opening 66 is too small to pass body 70 even in a reduced state with damage or destruction of one or more portions of second body 70.

Inner surface 62b may be smooth, but may also comprise one or more extensions, in the form of one or more ridges, nubs, points and/or mounts in order to amplify and/or direct a pressure applied to outer surface 62a to second body 70.

Second body 70 preferably comprises or consists of a conventional pillow squeaker known in the art. Second body 70 may be made similar or identical to second body 30 and function substantially or identically the same as second body 30.

Second body 70 may comprise any other suitable sound-making device having a sound-making device 72, a resilient air-holding body 74, and, preferably, a neck portion 76. Sound-making device 72 may be any suitable device that makes sound when air passes through, around, in, and/or about the device, but preferably device 72 comprises a natural or artificial reed held within a longitudinally-oriented body that is operationally held in neck portion 76.

Resilient body 74 is made of any suitable material, but preferably comprises PVC. Body 74 comprises a shell defining an enclosed space that is operatively connected to neck portion 76. During use, body 74 is normally filled with air. As a pressure is applied to toy 50, at least some of the air is forced from body 74 and passes through, around, in, and/or about sound-making device 76 causing the reed to vibrate and make a sound.

To make toy 50, second body 70 is preferably obtained with a sound-making device 72 disposed in body 70 or such a sound-making device 72 is installed in body 70. Substantially all the air present in the second body 70, specifically, air-holding body 74 is emptied out by for example, squeezing it out. Second body 70 is then arranged into second state, reduced state, by folding, rolling, and/or any other suitable means to fit through opening 65 or 66 of the first body. Therein, preferably, respective lateral portions of air-holding body 74, identical or similar to lateral portions 34a and 34b of air-holding body 34, are rolled about an axis passing through neck portion 76. Alternatively, the lateral portions are folded and/or rolled about a center of body 74 or a center of sound-making device 72 or body 74 folded and/or rolled a center of sound-making device 72.

Once inserted through opening 65 or 66, the second body 70, i.e., body 74, unfolds and/or unfurls, i.e., returning to substantially first state. Ambient air may then fill air-holding body 74 and second body becomes lodged within first body 60. Body 74 may be impinged by inner surface 62b and may not fully unfold and/or unfurl; although, body 74 may sufficiently expand to hold and release air when pressure 5 is applied. The missing shell portion is then joined to the other shell portions and body 60 is completed with body 70 inside body 60.

Second body 70 and opening 65 and/or 66 are preferably sized with respect to each other in such a way that the second body can pass through the opening when folded and/or rolled but that second body 70 cannot exit when unfolded and/or unfurled.

Moreover, first and second bodies 60, 70 are sized in such a way with respect to each other that when second body 70, in an unfolded and/or unfurled state, is disposed in the first body, the second body contacts inner surface 62b to be responsive to pressure 5 to released air from air-holding body 74.

While the present invention has been described at some length and with some particularity with respect to the several described embodiments, it is not intended that it should be limited to any such particulars or embodiments or any particular embodiment, but it is to be construed to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A sound-making pet toy, the pet toy comprising:
a shell comprising an outer surface, an inner surface, and an opening,
the opening connecting the outer surface to the inner surface,
the inner surface defining an inner space; and
a sound-making body disposed in the inner space,
the sound-making body comprising
a reduced size for passing through the opening to insert the sound-making body into the inner space and
an operative size preventing unintended removal of the sound-making body from the inner space,
the sound-making body comprising a resilient air-holding body and a sound making device,
the air holding body for holding a quantity of air in the operative size,
the sound-making body for making a sound responsive to air from the air-holding body passing through the sound-making device;
wherein the sound-making body when in the operative size is lodged against the inner surface of the shell;
wherein the sound-making body comprises two lateral sides;
wherein when the sound-making body has the reduced size, the sound-making body comprises a furled shape about a center of the sound-making body.

2. A sound-making pet toy, the pet toy comprising:
a shell comprising an outer surface, an inner surface, and an opening,
the opening connecting the outer surface to the inner surface,
the inner surface defining an inner space; and
a sound-making body disposed in the inner space,
the sound-making body comprising
a reduced size for passing through the opening to insert the sound-making body into the inner space and
an operative size preventing unintended removal of the sound-making body from the inner space,
the sound-making body comprising a resilient air-holding body and a sound making device,
the air holding body for holding a quantity of e operative size,
the sound-making body for making a sound responsive to air from the air-holding body passing through the sound-making device;
wherein the sound-making body when in the operative size is lodged against the inner surface of the shell;
wherein when the sound-making body has the reduced size, the sound-making body comprises a folded shape.

3. The sound-making pet toy of claim 2, wherein the sound-making body comprises two lateral sides.

4. The sound-making pet toy of claim 2, wherein the inner surface comprises an extension.

5. The sound-making pet toy of claim 2, wherein the sound-making body comprises a pillow squeaker.

6. The sound-making pet toy of claim 2, wherein the sound-making body in the operative size expels air from the resilient air holding body when a force impacts the shell.

7. The sound-making pet toy of claim 2, wherein the opening comprises a portion of the shell.

8. A sound-making pet toy, the pet toy comprising:
a shell comprising an outer surface, an inner surface, and an opening,
the opening connecting the outer surface to the inner surface,
the inner surface defining an inner space; and
a sound-making body disposed in the inner space,
the sound-making body comprising
a reduced size for passing through the opening to insert the sound-making body into the inner space and
an operative size preventing unintended removal of the sound-making body from the inner space,
the sound-making body comprising a resilient air-holding body and a sound making device,
the air holding body for holding a quantity of air in the operative size,
the sound-making body for making a sound responsive to air from the air-holding body passing through the sound-making device;

wherein he sound-making body when in the operative size lodged against the inner surface of the shell;
wherein when the sound-making body has the reduced size, the sound-making body comprises a furled shape.

9. The sound-making pet toy of claim 8, wherein the sound-making body in the operative size expels air from the resilient air holding body when a force impacts the shell.

10. The sound-making pet toy of claim 8, wherein the opening comprises a portion of the shell.

11. The sound-making pet toy of claim 8, wherein the inner surface comprises an extension.

12. The sound-making pet toy of claim 8, wherein the sound-making body comprises a pillow squeaker.

13. A sound-making pet toy, the pet toy comprising:
   a shell comprising an opening and an inner space accessible through the opening,
   a sound-making body comprising a reduced state and an expanded state larger than the reduced state,
      the sound-making body when disposed in the opening comprising the reduced state and when disposed in the inner space comprising the expanded state, and
      the sound-making body comprising a resilient air-holding body and a sound making device responsive to air from the air-holding body passing through the sound-making device;
   wherein the sound-making body when in the expanded state is lodged against the inner surface of the shell.

14. The sound-making pet toy of claim 13, wherein the sound-making body in the expanded state is larger than the opening.

15. The sound-making pet toy of claim 13, wherein the sound making device is a neck of the sound-making body.

16. The sound-making pet toy of claim 13, wherein the opening comprises a portion of the shell.

17. The sound-making pet toy of claim 13, wherein the inner surface comprises an extension.

18. The sound-making pet toy of claim 13, wherein the sound-making body comprises a pillow squeaker.

19. A method of making a sound-making pet toy,
the pet toy comprising:
   a shell comprising an opening and an inner space accessible through the opening,
   a sound-making body comprising a reduced state and an expanded state larger than the reduced state,
      the sound-making body when disposed in the opening comprising the reduced state and when disposed in the inner space comprising the expanded state, and
      the sound-making body comprising a resilient air-holding body and a sound-making device, the sound-making body for making a sound responsive to air from the air-holding body passing through the sound-making device, the sound-making body when in the expanded state is lodged against the inner surface of the shell;
the method comprising the steps of:
   (a) providing the shell;
   (b) providing the sound-making body;
   (c) manipulating the sound-making body into the reduced state;
   (d) inserting the sound-making body in the reduced state into the opening;
   (e) moving the sound-making body from the opening into the inner space; and
   (f) causing the sound-making body to comprise the expanded state in the inner space.

20. The method of claim 19, wherein the sound-making body comprises two lateral sides and step (c) requires that the sound-making body is furled about a centerline between the lateral sides.

21. The method of claim 19, wherein step (c) requires that the sound-making body is folded.

22. The method of claim 19, wherein step (c) requires that the sound-making body is rolled.

23. The method of making a sound-making pet toy of claim 19, wherein the inner surface comprises an extension.

\* \* \* \* \*